Feb. 6, 1968 G. JANTZEN 3,367,286

LOAD CONTROL SYSTEMS

Filed Sept. 1, 1965 4 Sheets-Sheet 1

INVENTOR.
GEORGE JANTZEN

Feb. 6, 1968  G. JANTZEN  3,367,286
LOAD CONTROL SYSTEMS
Filed Sept. 1, 1965  4 Sheets-Sheet 2

INVENTOR.
GEORGE JANTZEN

Feb. 6, 1968  G. JANTZEN  3,367,286
LOAD CONTROL SYSTEMS
Filed Sept. 1, 1965  4 Sheets-Sheet 3

INVENTOR.
GEORGE JANTZEN

INVENTOR.
GEORGE JANTZEN

United States Patent Office 3,367,286
Patented Feb. 6, 1968

3,367,286
LOAD CONTROL SYSTEMS
George Jantzen, New York, N.Y., assignor to M. Steinthal & Co. Inc., New York, N.Y., a corporation of New York
Filed Sept. 1, 1965, Ser. No. 489,096
9 Claims. (Cl. 105—369)

ABSTRACT OF THE DISCLOSURE

A track and beam support for securing loads in trucks etc. The hardware engages the track through apertures which extend into spaced opposed support shoulders and rests upon one of the shoulders.

---

This invention relates to load controlling devices and more particularly load controlling devices to be used in a cargo space such as a railroad box car, a truck trailer, a van and the like.

In the transportation of cargo in a moving vehicle, it is often necessary to provide means for preventing the cargo from shifting its position within the vehicle. Shifting causes damage both to the cargo and to the vehicle. A common practice is to strap the cargo to an anchor rigidly affixed to the inner wall of the vehicle. Another practice is to place wooden beams transversely across the cargo space of the vehicle to restrain the load. These beams are attached at both ends to anchors rigidly affixed to the inner wall of the vehicle by suitable supports.

It is known to use an elongated track rigidly affixed to the inner wall of the vehicle as the anchor to which the restraining beams or straps are connected. The prior known straps and beams are provided with connectors and supports respectively, which cooperate with apertures in the track.

The connector most commonly used between the restraining strap and the wall track is one which protrudes into the cargo space. This prevents a load from being placed flush against the inner wall of the vehicle directly in front of the connector and also increases the chance that the load will be damaged. Also, such a connector has a limited degree of pivotal freedom within the track so that for many strapping applications there is an angle between the connector and the restraining strap. Because of this absence of "in-line" loading, there is a tendency for the connector to be physically distorted due to the forces exerted on it by the restraining strap. Also there is a tendency for the restraining strap to be rapidly worn through at the region where it is attached to the connector.

The beam support most commonly used to connect the beam and the anchoring track is one which cooperates with slots in an elongated track by means of metal ears which are inserted into the slots and are held against the inner side of the track by a levered locking member. These metal ears provide substantially all of the load support, and therefore have a tendency to distort under heavy loads. The levered locking member is positioned within the beam support and is held closed by the beam itself. To actuate this levered locking member, a workman must completely remove the beam from the support and insert his finger into a relatively narrow passageway to rotate the lever. Since a workman handling cargo generally wears protective gloves, it is difficult to reach the locking member to actuate it.

It is, therefore, an object of the present invention to provide an anchoring track which will permit loading a cargo flush against a wall at the point where the strap connector engages the track.

A further object of the present invention is to provide an anchoring track which has improved load-supporting characteristics.

A further object of the present invention is to provide an anchoring track which can be mounted either vertically or horizontally in a cargo handling space.

Another object of the present invention is to provide a connector for a restraining strap which cooperates with the anchoring track to have approximately 180 degrees of pivotal freedom.

A still further object of the present invention is to provide a connector for a restraining strap which cooperates with the anchoring track to have "in-line" loading at any angle.

A still further object of the present invention is to provide a support for a beam which has extremely simple means for attaching and releasing it to and from the anchor track.

A further object of the present invention is to provide a beam and beam supports in a single unit of increased strength and ease of operation.

To these ends, the invention provides an anchoring track having a recessed channel to accommodate the strap connectors and the beam supports and has load supporting shoulders. The track can be mounted either horizontally or vertically and will provide the same load supporting characteristics in either position. Another feature of the invention is a beam support having a pressable locking plate which is easily accessible from outside the support. A still further feature of the invention is a connector which can lay flat within the recessed channel of the anchoring track, which provides 180 degrees of "in-line" loading and which has minimum bending characteristics and high load bearing characteristics.

The invention will be better understood from the following more detailed description taken in conjunction with the accompanying drawings in which.

Figure 1:
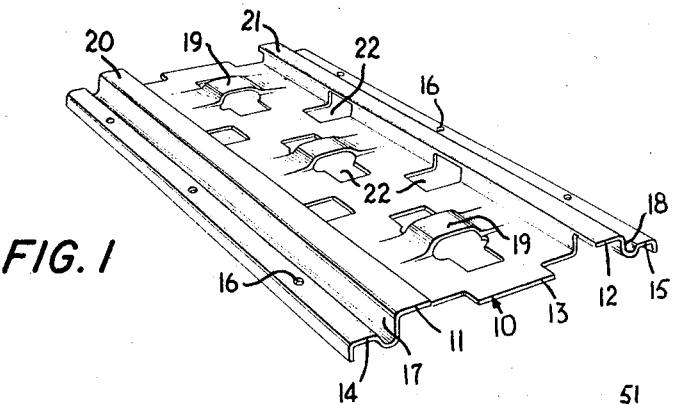
FIGURE 1 shows an anchoring track suitable for horizontal or vertical mounting.
Figure 4:
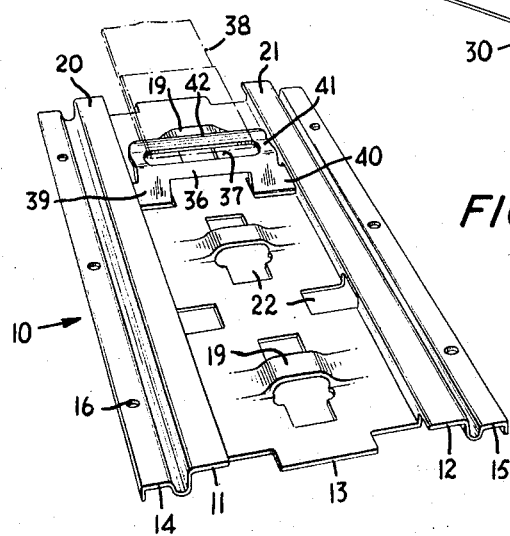
FIGURES 4 to 7 show the strap connector of FIGURE 3 connected to the track shown in FIGURE 1.

Referring to FIGURES 1 and 4 a track or anchor member is shown generally as 10 to which a beam support or strap connector can be removably effixed. Track 10 is adapted to be secured along the inside walls of the vehicle in either a vertical or horizontal position. In vehicles where it is desired to carry loads in tiers, such as where the loads cannot be stacked one upon the other due to the fragility or peculiar design of the bottom load, track 10 can be secured to the inner wall of the vehicle in a vertical position. For other loads which can be secured by simple strapping or shorting techniques, a horizontal installation of the track may be more desirable. The same track serves equally well in either position.

Track 10 has two shoulder members 11 and 12 connected by web 13. Formed along the edges of track members 10 are smaller shoulder members 14 and 15, having fastening holes 16 therein. The track is secured to the structural members (not shown) of the vehicle wall by suitable fastening means (also not shown) through holes 16. The panelling on the inner surface of the vehicle wall is then secured to the structural members of the vehicle wall so that the panelling covers the smaller shoulder members 14 and 15 and abuts the outer surfaces 17 and 18 of the shoulder members 11 and 12. Using panelling of appropriate thickness so that its surface lies flush with the upper surface of shoulder members 11 and 12, the inner wall of the vehicle appears as a smooth surface with no projections to snag or damage the load and the web 13 of track 10 appears as a recessed channel within the vehicle wall.

Track 10 is also provided with a plurality of ribs or cross members 19 extending transversely across web 13. Ribs 19 advantageously extend to lie in the plane of the upper surfaces 20 and 21 of shoulder members 11 and 12.

As can be seen in FIGURE 4, track 10 is provided with a plurality of apertures 22 which begin on web 13 and extend into the shoulder members 11 and 12 or cross members 19. As can also be seen, apertures 22 are arranged in pairs, an aperture extending into one shoulder member 11 lying directly opposite a second aperture extending into the other shoulder member 12 and an aperture 22 extending into one cross member 19 lying directly opposite a second aperture 22 extending into a second cross member 19.

Figure 2:
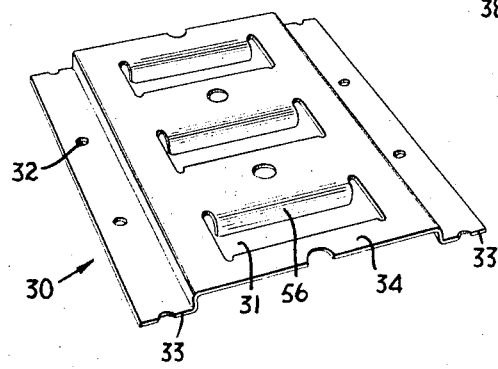
FIGURE 2 shows an anchoring track known in the art.
Figure 8:
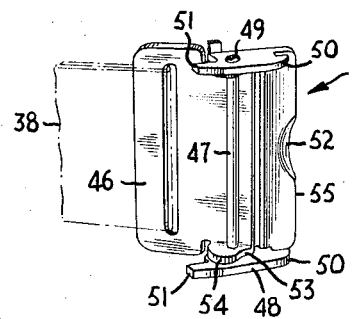
FIGURES 8 to 11 show a strap connector adapted to fit the known track shown in FIGURE 2.
Figure 9:
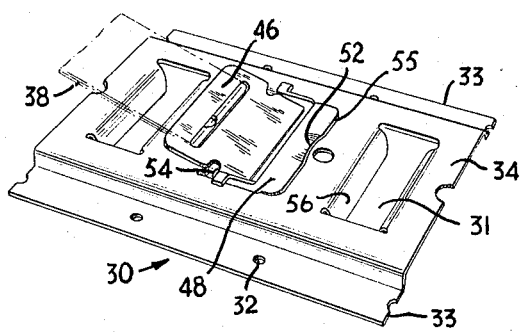

As will be explained in more detail hereinbelow, the apertures 22 are adapted to cooperate with strap connectors and beam supports used to secure the load in the vehicle. FIGURE 2 shows another form of track, shown generally at 30 already known in the art. The slots 31 in the web 34 in the track 30 receive strap connectors and beam supports of appropriate design to secure them to the track 30 and hence to the wall of the vehicle. The track 30 is affixed to the vehicle wall through holes 32 on its flanges 33.

Figure 3:
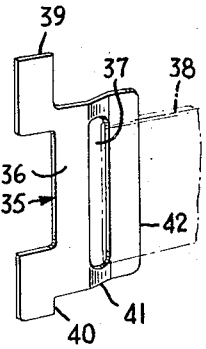
FIGURE 3 shows a strap connector.

FIGURES 3 to 7 show a strap connector 35 and said strap connector inserted and connected in the track 10 respectively. In FIGURE 3, strap connector 35 comprises a substantially flat piece 36 having an elongated slot 37 therein. A strap 38 is inserted through slot 37 and folded back upon itself about the strap engaging member 42 and contiguous portions of the strap suitably fastened together, as by stitching. The flat piece 36 of the connector 35 is provided with two tongue members 39 and 40.

Tongue member 39 is longer than tongue member 40. This is to facilitate insertion and removal of the strap connector 35 into and from the track 10.

Figure 5:
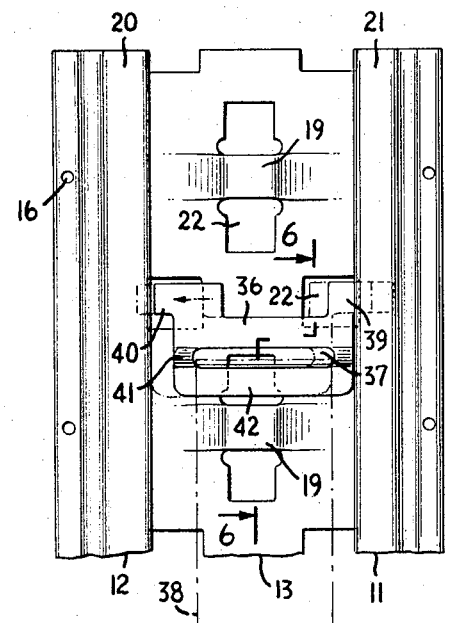
Figure 6:
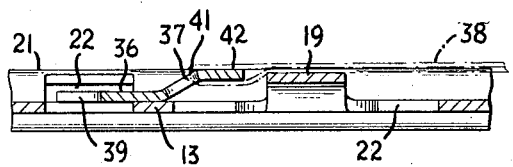
Figure 7:
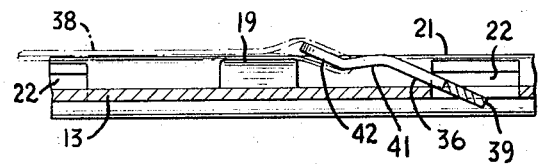

Referring to FIGURE 5 the apertures 22 of the track 10 and the tongue members 39 and 40 of the connector 35 cooperate in the following manner: First the longer tongue 39 is obliquely placed within the upper one of the aperture 22 and inserted as far as it can go; this permits the shorter tongue 40 to clear the lower shoulder member 12. The connector 35 is then moved downward so that shorter tongue 40 can be easily inserted into the lower one of the paired and opposite apertures 22.

As can be further seen in FIGURES 3 to 7, connector 35 has a jogged portion 41 therein. The jogged portion 41 permits the strap engaging member 42 to be spaced from the web 13 so that the thickness of the strap 38 will not interfere with the tongue members 39 and 40 being flush against the web 13. Advantageously in the flush position, the strap engaging member 42 lies at or below the surface 20, 21 of the shoulders 11 and 12.

It is to be noted that while the above discussion is in terms of a horizontally positioned track, the discussion is equally applicable to a vertically positioned track. In a vertically positioned track, the connector 35 would cooperate with pairs of opposite apertures 22 which extend into the cross members 19.

It will be readily apparent that the engagement between the connector tongues 39 and 40 and the shoulder members 11 and 12 permits the connector to pivot in the track 10. In effect, connector 35 is pivotably engaged with the track 10, having a large degree of angular freedom. For example, if by virtue of a particular load, strap 38 is pulled to the right, the connector 35 will position with a strap 38 in that direction. Similarly, if by virtue of a particular load, strap 38 is pulled to the left, the connector 35 will pivot to and "in-line" position with the strap 38 in that direction. In other words, because of the particular engagement of the tongues 39 and 40 with shoulder members 11 and 12 the connector 35 remains in line with the strap. Furthermore, at any angle of the connector to the track the strap will not pull at an angle to the connector which could produce undesirable bending forces on the connector. "In-line" loading greatly reduces the wear and tear that the strap is subjected to at the portion thereof attached to the connector. In prior known strap connectors, the pivotal movement of the connector is restricted with respect to the wall of the vehicle. Therefore, when, by virtue of the loads being supported, the strap is pulled in different directions, there is rubbing between the strap and the connector. This rubbing weakens the strap and eventually causes it to fail.

Strap connector 35 thus minimizes or eliminates bending characteristics which limit the load retaining abilities of known connectors. In strap connector 35 the load is retained as sheer stress across the tabs 39, 40 and high load carrying capacities are achieved.

In a vehicle equipped with the track 10 and strap connector 35, a load can be placed flush against the vehicle's inner wall directly in front of the connector 35. As mentioned above, the track 10 has no portion thereof protruding beyond the vehicle panelling. Also, when the connector 35 is so positioned that it lays fully within the track 10, the strap 38 can extend along the web within the recessed channel formed by the shoulder members 11 and 12 and no part of the connector will protrude beyond the panelling. Thus, it is possible to place a load, for example, a substantially cubic crate, flush against the vehicle wall directly in front of the strap connector 35. In this arrangement, the strap 38 will run in the recessed channel until reaching the edge of the crate. Then the strap can be brought out of the recessed channel and wrapped around the crate.

Figure 10:
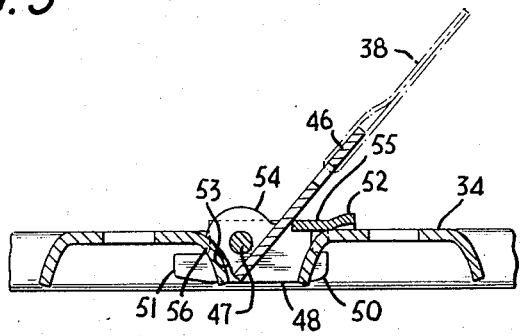
Figure 11:
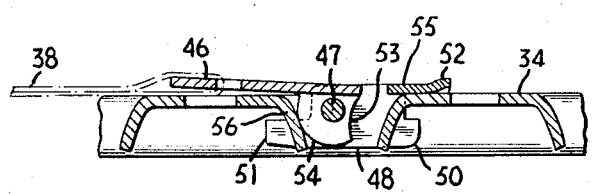

FIGURES 8 to 11 show a strap connector shown generally as 45 which will provide "in-line" loading in use with the track 30 shown in FIGURE 2. In this strap connector, a plate 46 is pivotably connected by pivot pin 47 to the track engaging member 48. Pivot pin 47 is set into the track engaging member 48 at holes 49. When the plate 46 is pivoted fully over the plate 55 of the track engaging member 48, as shown in FIGURE 10 the concave surface 53 is positioned to permit the ears 51 to be inserted into the slot 31 sufficiently so that ears 50 will also clear the web 34 and pass into the slot 31. With the track engaging member 48 thus inserted into the track 30, the ears 50 are slid under the web 34. The plate 46 enjoys a considerable angle of pivot with respect to track 30 in which "in-line" loading with respect to strap 38 is obtained. Through most of this pivot angle, for example, as shown in FIGURE 11 the convex surfaces 54 is in contact with the inwardly curved tab 56 of the web 34 and prevents the ears 50 from sliding out from under the web 34, so that the track engaging member 48 is locked into the track 30. Track engaging member 48 has a raised thumb tab 52 thereon which is useful for inserting or removing the connector. The connector is effectively locked into the track and provides "in-line" loading for any pivot angle from flat upon the web 34 to the "insert angle" shown in FIGURE 10. For strap loading at angles to the track 30 near and beyond the "insert angle" it would be necessary to insert the connector 45 in the track 30, oppositely.

Figure 12:
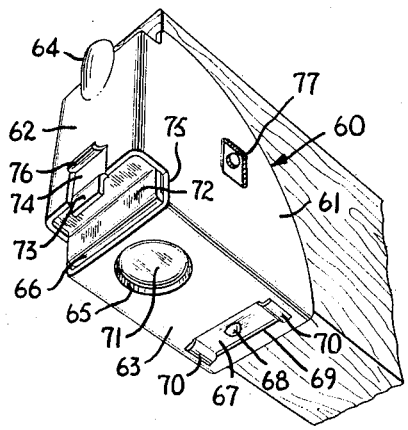
FIGURE 12 shows a beam support.

FIGURE 12 shows a beam support shown generally at 60 which is adapted to cooperate with the track or anchor member 10 of FIGURE 1. The beam support 60 comprises parallel sides 61 a rear wall 62 and a base 63. Rear wall 62 is provided with an upward projecting tab 64 at its upper end. Tab 64 is slightly curved to offer high bending strength and cooperates with an upper one of the pairs of apertures 22 of track 10. Base 63 is provided with an access hole 65 of a size such that a workman can insert a gloved finger therethrough. Access hole is advantageously positioned towards rear wall 62. Beam support 60 is additionally provided with a locking plate 66 connected to the base 63, by means of spring member 67. Spring member 67 is fastened to locking plate 66 by means of a suitable rivet fastener 68 through a slot 69 in the base 63. The jogged ends 70 of the spring member 67 overhang the ends of slot 69 and lie against the base 63. Slot 69 is advantageously positioned in the portion of the base 63 away from rear wall 62. By means of this construction, locking plate 66 is held against the base 63. When a workman inserts his finger into the access hole 65 and pushes up on dimple 71 on the locking plate 66, the rear portion of the locking plate 66 will lift off the base 63. When the workman removes his finger from the dimple 71 on locking plate 66 spring member 67 will restore locking plate 66 to its original position, i.e. lying flat upon the base 63. Locking plate 66 has a cross rib 78 between the dimples 71 and the fastener 68.

Locking plate 66 is further provided at its rear end with an angled portion 72 having a second tab member 73 extending downwardly therefrom. Tab 73 is aligned with upward tab 64. Rear wall 62 is cut out at 74 at its bottom portion to permit tab 73 to recede therein. When locking plate 66 is pushed and lifted off the base, tab 73 is raised so that it recedes into the cut out 74.

The sides 61 and rear wall 62 cut out are at their lower rear portions at 75 to form a step-like region in the beam support. As will be explained in more detail below, this step-like region aids in the support of the beam. A rearwardly extending tab 76 extends from the rear wall 62 above the rear cut out 74.

Figure 13:
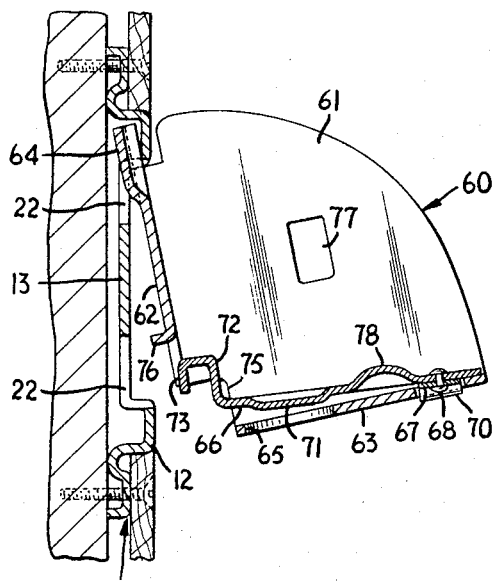
FIGURE 13 shows the beam support of FIGURE 7, being inserted into the anchoring track shown in FIGURE 1.
Figure 14:
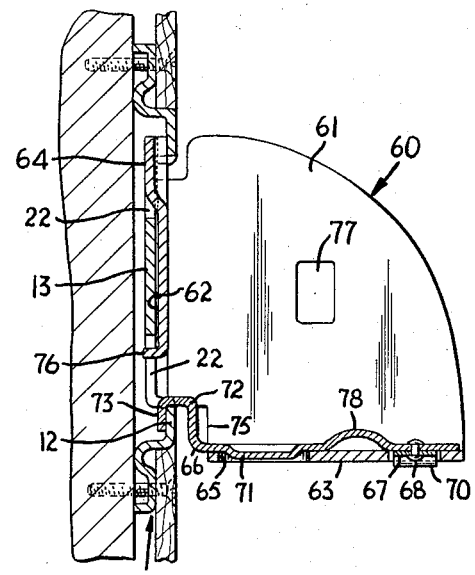
FIGURE 14 shows the beam support connected to the track.

Referring to FIGURES 13 and 14, the beam support 60 is affixed to track 10 in the following manner: A workman obliquely inserts tab 64 into an upper one of the pair of apertures. Then he pushes on the dimple 71 on locking plate 66 through access hole 65. This raises tab 73 and permits the beam support and tab 73 to clear the lower shoulder member 12 to the track 10. Then the workman straightens beam support 60 so that its rear wall 62 rests against web 13 of the track 10. When the workman releases locking plate 66, tab 73 will be restored to its normal position and will enter the lower one of the pair of apertures 22. The rearward tab 76 extends into the lower aperture 22 at the upper portion of the aperture and positions the lower tab 73 in the aperture. As can be seen in FIGURE 14, by virtue of the cut out portions of the walls and rear at 75, beam support 60 rests on the lower shoulder member 12 of the track 10. This gives the assembly of beam support 60 and track 10 added load supporting capacity. This shelf loading characteristic and the bend resisting design of the upper tab 64 combine to provide a beam support of an extremely big load supporting character.

After beam supporting 60 is affixed to the track in the manner described, an ordinary cut of wood, for example 2″ x 4″ is placed therein and extends to another beam support an track assembly on the opposite wall of the vehicle. The wood beam rests on the cross rib 78. The purpose of the cross rib 78 is to locate the load from the wooden beam at the cross rib 78. In this way, the bending moment on the beam support 60 cannot be unduly increased to such extent as would be achieved if the load was applied to the beam support 60 further rearward. Moreover, the placement of the cross rib 78 forward of the spring member 67 assures that the wooden beam will aid in holding the locking plate 66 in its down position.

Side member 61 may be provided with holes therein to permit insertion of pins to hold the wood in place.

Alternatively, slots 77 may be provided in side walls 61. This permits the wooden beam to be permanently within the beam support and allow the beam to be raised slightly when locking plate 66 is pushed. In either embodiment, the beam itself aids in keeping the beam support affixed to the track by keeping the locking plate 66 down.

Figure 15:
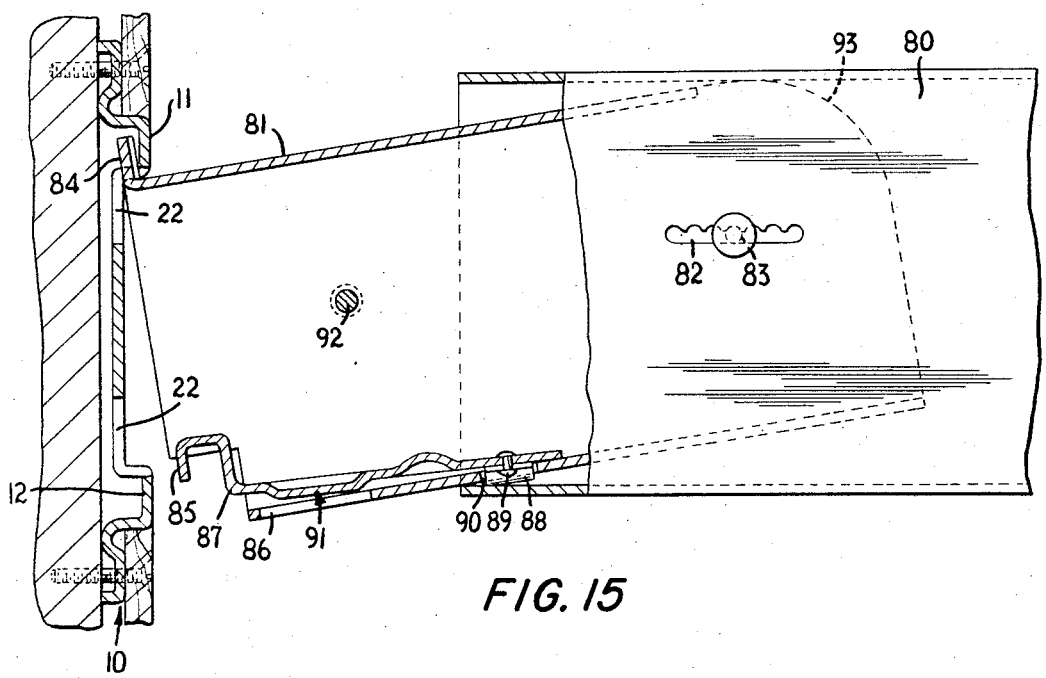
FIGURES 15 and 16 show a beam support and beam combined in a single unit.
Figure 16:
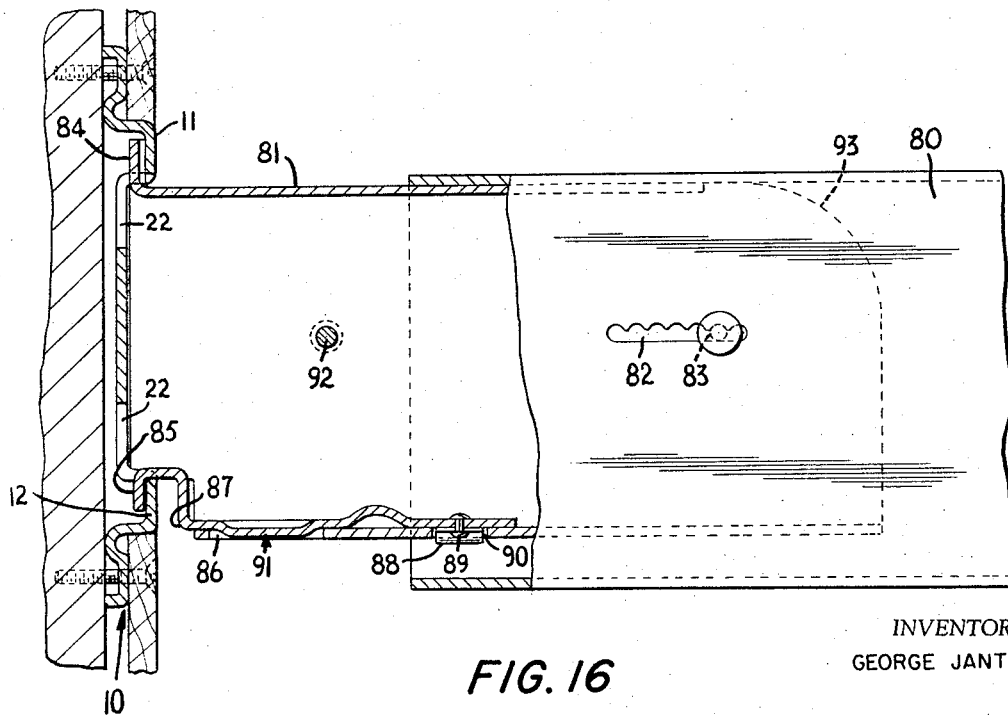

An alternative beam support structure is shown in FIGURES 15 and 16. Instead of using a wooden beam with independent beam supports, a hollow, substantially rectangular metal beam 80 is provided with a beam support 81 slideably attached therein. It is to be noted that for the sake of simplicity, only one end of the beam 80 with its beam support 81 is shown. The actual beam support structure contemplated has one beam support 81 at each end of the beam 80.

Beam 80 has a substantially rectangular cross section, two opposite sides of which are provided with elongated slots 82 in the longitudinal direction of the beam 80 in the proximity of the beam end.

Beam support 81 also has a substantially rectangular cross section. It is provided towards its rear portion with a pin 83 which cooperates with slots 82 of the beam permitting the beam support 81 to slide within the beam 80. The beam support 81 is sufficiently spaced from the beam 80 at its bottom so that the beam support 81 can pivot slightly around pin 83. As will be explained below, this facilitates the attachment of the beam support to the anchoring track 10.

At its front end beam support 81 is provided with two oppositely disposed tabs 84 and 85 protruding substantially normally from the beam support. Tab 84 is rigidly affixed to the beam support 81. The beam support 81 is provided at its bottom with an access hole 86 through which a workman can insert a gloved finger. Tab 85 is rigidly attached to a locking plate 87 which is connected to the beam support 81 by means of spring member 88 which is seated in a hole 90 with its ends extending beyond the hole 90. Spring member 88 is fastened to locking plate 87 by means of a suitable fastener 89. When a workman inserts his finger through access hole 86 and pushes up on dimple 91 on the locking plate 87, tab 85 will lift up. When the workman removes his finger from the dimple 91, spring member 88 will restore locking plate 87 to its original position. Pin 92 is attached to the beam support 81 towards its forward end to provide extra strength. The beam support 81 is curved at the upper portion of its rear end at 93 to allow the beam support 81 to pivot within the beam 80.

Beam 80 is affixed to track 10 in the following manner: A workman positions the beam 80 so that beam support 81 is in the proximity of track 10. He pivots beam support 81 downward so that tab 84 can clear beneath the upper shoulder 11 of the track 10 and be inserted into an upper one of the pair of apertures 22. Then he pushes on locking plate dimple 91 through access hole 86 to raise tab 85 to clear above the lower shoulder 12. When the workman straightens the beam support 81 and releases locking plate 87, tab 85 will be restored to its normal position and will enter the lower aperture 22 thereby securing the beam 80 to the vehicle wall. The same procedure may be followed to secure the opposite end of the beam support to the opposite vehicle wall.

Although my invention has been shown and described with reference to particular embodiments it should be understood that departures may be made therefrom within the scope of my invention as set forth in the following claims.

What is claimed is:

1. An attachment fitting for supporting a beam at an anchoring means, said attachment fitting comprising a base, a rear wall and a pair of spced side walls extending from said base, a first tab extending from said rear wall and adapted to cooperate with an aperture in a first load bearing wall in said anchoring means, a pressable plate pivotably attached to said base and resting thereon and having a second tab extending therefrom in a direction opposite to said first tab and adapted to cooperate with an aperture in a second load bearing wall spaced from and opposed to said first load bearing wall in said anchoring means, and means for access to said pressable plate to push said plate whereby said second tab is moved in the direction of said first tab.

2. An attachment fitting according to claim 1 in which said base has an aperture rearward of said access means, a spring member positioned in and extending beyond said aperture and means for fastening said pressable plate to said spring member.

3. An attachment fitting according to claim 1 in which said base has a hole therein between said rear wall and the place at which said pressable plate is attached to said base for providing access to push said pressable plate.

4. An anchoring means to which an attachment fitting can be releasably secured comprising a web portion and a pair of spaced shoulder members extending from said web portion and thus forming a recessed channel between them, each of said shoulder members providing one of a pair of spaced opposed load bearing walls, said anchoring means having at least one pair of spaced opposed apertures each of which commences in said web portion and extends into respective ones of said spaced opposed load bearing walls whereby said attachment fitting can rest upon and be supported by one of said load bearing walls.

5. An attachment fitting for supporting a beam at an anchoring means according to claim 4, said attachment fitting comprising a base, a rear wall and a pair of spaced side walls extending from said base, a first tab extending from said rear wall and adapted to cooperate with an aperture in said anchoring means, a pressable plate pivotably attached to said base and resting thereon and having a second tab extending in a direction therefrom opposite to said first tab and adapted to cooperate with an aperture in said anchoring means, means for access to said pressable plate to push said plate whereby said second tab is moved in the direction of said first tab and loading surfaces adapted to rest upon and be supported by said load bearing walls on said anchoring means when said attachment fitting is secured to said anchoring means.

6. An anchoring means to which an attachment fitting can be releasably secured comprising a pair of shoulder members separated by a web member and thus forming a channel between them, at least one pair of spaced cross members extend from said web portion transversely to said shoulder members, each of said cross members providing one of a pair of spaced opposed load bearing walls, said anchoring means having at least one pair of spaced opposed apertures aligned substantially parallel to said shoulder members each of which commences in said web portion and extends into respective ones of said spaced opposed load bearing walls provided by said cross members whereby said attachment fitting can rest upon and be supported by said load bearing walls.

7. An attachment fitting for supporting a beam at an anchoring means, said attachment fitting comprising a base, a rear wall and a pair of spaced side walls extending from said base, a first tab extending from said rear wall and adapted to cooperate with an aperture in said anchoring means, a pressable plate pivotably attached to said base and resting thereon and having a second tab extending therefrom in a direction opposite to said first tab and adapted to cooperate with an aperture in said anchoring means, and downwardly disposed loading surface adapted to rest upon and be supported by load bearing walls on said anchoring means when said attachment fitting is secured to said anchoring means.

8. An attachment fitting for supporting a beam at an anchoring means, said attachment fitting comprising a base, a rear wall and a pair of spaced side walls extending from said base, a first tab extending from said rear wall and adapted to cooperate with an aperture in said anchoring means, a pressable plate pivotably attached to said base and resting thereon and having a second tab extending therefrom in a direction opposite to said first tab and adapted to cooperated with an aperture in said anchoring means, said fitting being cut away at the convergence of its base and rear wall to provide a loading surface for resting uopn load bearing shoulder surface in said anchoring means.

9. An attachment fitting for supporting a beam at an anchoring means, said attachment fitting comprising a base, a rear wall and a pair of spaced side walls extending from said base, a first tab extending from said rear wall and adapted to cooperte with an aperture in said anchoring means, a pressable plate pivotably attached to said base and resting thereon and having a second tab extending therefrom in a direction opposite to said first tab and adapted to cooperate with an aperture in said anchoring means, said attachment fitting having means providing access to said pressable plate to push said plate whereby said second tab is moved out of contact with said anchoring means and a rib upon said pressable plate positioned between said second tab and the point of attachment of said pressable plate and being raised above said pressable plate to support the entire load of said beam thereon.

References Cited

UNITED STATES PATENTS

| | | | |
|---|---|---|---|
| 2,817,305 | 12/1957 | Stough | 105—369 |
| 2,859,008 | 11/1958 | Zimmer | 248—223 |
| 2,894,241 | 7/1959 | McKee | 248—223 |
| 2,980,037 | 4/1961 | Elsner | 105—369 |
| 3,066,620 | 12/1962 | Schroeder | 105—369 |
| 3,114,338 | 12/1963 | Schroeder et al. | 105—369 |
| 3,193,225 | 7/1965 | Terlinde | 248—223 |
| 3,241,500 | 3/1966 | Simpson et al. | 105—369 |

ARTHUR L. LA POINT, *Primary Examiner.*

DRAYTON E. HOFFMAN, *Examiner.*